(12) United States Patent
Kumazawa et al.

(10) Patent No.: US 12,410,333 B2
(45) Date of Patent: Sep. 9, 2025

(54) INKJET INK (71) Applicant: NORITAKE CO., LIMITED, Nagoya (JP)

(72) Inventors: Tomoshi Kumazawa, Nagoya (JP); Hiromichi Hayashi, Nagoya (JP); Yuuki Arakawa, Nagoya (JP)

(73) Assignee: NORITAKE CO., LIMITED (JP)

( * ) Notice: Subject to any disclaimer, the term of this patent is extended or adjusted under 35 U.S.C. 154(b) by 832 days.

(21) Appl. No.: 17/432,679

(22) PCT Filed: Dec. 27, 2019

(86) PCT No.: PCT/JP2019/051397
§ 371 (c)(1),
(2) Date: Aug. 20, 2021

(87) PCT Pub. No.: WO2020/174869
PCT Pub. Date: Sep. 3, 2020

(65) Prior Publication Data
US 2022/0089893 A1 Mar. 24, 2022

(30) Foreign Application Priority Data
Feb. 27, 2019 (JP) .................. 2019-034699

(51) Int. Cl.
*C09D 11/38* (2014.01)
*B41M 5/00* (2006.01)
*B41M 5/382* (2006.01)
*C08F 220/18* (2006.01)
*C08F 220/30* (2006.01)
*C08F 222/10* (2006.01)
*C08F 224/00* (2006.01)
*C08F 226/06* (2006.01)
*C08K 3/013* (2018.01)
*C08K 3/40* (2006.01)
*C09D 11/322* (2014.01)

(52) U.S. Cl.
CPC ............ *C09D 11/38* (2013.01); *B41M 5/007* (2013.01); *B41M 5/3825* (2013.01); *C08F 220/1807* (2020.02); *C08F 220/301* (2020.02); *C08F 222/102* (2020.02); *C08F 224/00* (2013.01); *C08F 226/06* (2013.01); *C08K 3/013* (2018.01); *C08K 3/40* (2013.01); *C09D 11/322* (2013.01)

(58) Field of Classification Search
None
See application file for complete search history.

(56) References Cited

U.S. PATENT DOCUMENTS

| | | | |
|---|---|---|---|
| 6,357,868 B1 | 3/2002 | Pfaff et al. | |
| 2004/0142765 A1 | 7/2004 | Kennedy, III et al. | |
| 2004/0145639 A1 | 7/2004 | Noutary | |
| 2007/0159615 A1 | 7/2007 | Horiuchi | |
| 2009/0117276 A1 | 5/2009 | Ito | |
| 2010/0075119 A1* | 3/2010 | Ohnishi | C09D 11/101 524/83 |
| 2010/0227076 A1 | 9/2010 | Yokoi et al. | |
| 2010/0247873 A1 | 9/2010 | Yokoi | |
| 2013/0010039 A1 | 1/2013 | Kida et al. | |
| 2013/0017388 A1 | 1/2013 | Boguslavsky | |
| 2017/0022379 A1 | 1/2017 | Loccufier et al. | |
| 2017/0107388 A1 | 4/2017 | Wang et al. | |
| 2018/0093516 A1* | 4/2018 | Nakamura | B41M 5/0017 |
| 2020/0199389 A1 | 6/2020 | Hayashi et al. | |
| 2022/0017761 A1 | 1/2022 | Kumazawa et al. | |

FOREIGN PATENT DOCUMENTS

| | | |
|---|---|---|
| EP | 2228417 | 9/2010 |
| EP | 2236570 | 10/2010 |
| EP | 3101072 | 12/2016 |
| ES | 2220286 T | 12/2004 |
| JP | 2001039008 | 2/2001 |
| JP | 2001081363 | 3/2001 |
| JP | 2002274984 | 9/2002 |
| JP | 2006036559 | 2/2006 |
| JP | 2008163080 | 7/2008 |
| JP | 2009062541 | 3/2009 |
| JP | 2009154419 | 7/2009 |
| JP | 2010209183 | 9/2010 |
| JP | 2010235880 | 10/2010 |
| JP | 2012144682 | * 8/2012 |
| JP | 5708918 | 4/2015 |
| JP | 2016176084 | 10/2016 |
| JP | 6083484 | 2/2017 |
| JP | 2017075251 | 4/2017 |

(Continued)

OTHER PUBLICATIONS

Machine translation of JP 2012144682 (Year: 2012).*

(Continued)

*Primary Examiner* — Robert T Butcher
(74) *Attorney, Agent, or Firm* — Taylor Duma LLP (57) ABSTRACT

Inkjet ink disclosed herein, usable for at least a transfer sheet suitable for an inorganic substrate, contains an inorganic solid content and a photocurable monomer component. The monomer component contains at least a monofunctional acrylate-based monomer, a monofunctional N-vinyl compound monomer, and a polyfunctional vinylether-based monomer. With respect to 100% by mass as the total weight of the monomer component, the monofunctional acrylate-based monomer is contained at a weight ratio of 40% by mass to 96% by mass, the monofunctional N-vinyl compound monomer is contained at a weight ratio of 2% by mass to 20% by mass, and the polyfunctional vinylether-based monomer is contained at a weight ratio of 2% by mass to 40% by mass.

20 Claims, 2 Drawing Sheets (56) References Cited

FOREIGN PATENT DOCUMENTS

| JP | 6327269 | 5/2018 |
|---|---|---|
| WO | 2007020779 | 2/2007 |
| WO | 2007080779 | 7/2007 |
| WO | 2011161817 | 12/2011 |
| WO | 2015115600 | 8/2015 |
| WO | WO2017169905 | 10/2017 |
| WO | 2019044429 | 3/2019 |
| WO | 2020174870 | 9/2020 |

OTHER PUBLICATIONS

Kumazawa, Tomoshi; International Search Report and Written Opinion for PCT/JP2019/051397, filed Dec. 27, 2019, mailed Mar. 10, 2020, 15 pgs.

Kumazawa, Tomoshi; International Preliminary Report on Patentability for PCT/JP2019/051398, filed Dec. 27, 2019, mailed Aug. 25, 2021, 11 pgs.

Kumazawa, Tomoshi; International Search Report and Written Opinion for PCT/JP2019/051398, filed Dec. 27, 2019, mailed Mar. 10, 2020, 12 pgs.

Obata, et al.; Article entitled: "Fabrication of decorative ink on pottery using light-curing resin", The 54th Symposium on Basic Science of Ceramics, published Jan. 7, 2016, 5 pgs.

Kumazawa, Tomoshi; International Preliminary Report on Patentability for PCT/JP2019/051397, filed Dec. 27, 2019, mailed Aug. 25, 2021, 9 pgs.

Noritake Co., Limited; Office Action for Chinese patent application No. 201980093085.3, mailed Aug. 25, 2022, 11 pgs.

Noritake Co., Limited; Search Report for Spain patent application No. 202190049, mailed Oct. 11, 2022, 8 pgs.

Noritake Co., Limited; Decision of Refusal for Japanese Patent application No. 2021501653, mailed Mar. 23, 2023, 9 pgs.

Noritake Co., Limited; Office Action for Japanese Patent application No. 2021501653, mailed Nov. 24, 2022, 14 pgs.

Kumazawa, Tomoshi, Non-Final Office Action for U.S. Appl. No. 17/432,687, filed Aug. 20, 2021, mailed Dec. 19, 2024, 12 pages.

Kumazawa, Tomoshi; Final Office Action for U.S. Appl. No. 17/432,687, filed Aug. 20, 2021, mailed May 2, 2025, 21 pgs.

* cited by examiner

INKJET INK

BACKGROUND OF THE INVENTION

Technical Field

The present invention relates to inkjet ink, and more specifically, inkjet ink, for a transfer sheet, that is usable to draw an image on a transfer sheet for an inorganic substrate. The present application claims priority based upon Japanese Patent Application No. 2019-034699 filed on Feb. 27, 2019, the entirety of which is incorporated herein by reference.

Background Art

Inkjet printing has conventionally been used as one of printing methods to draw a desired image such as a pattern, a letter or the like on a printing target. Such inkjet printing allows a highly precise image to be drawn by a simple and low-cost device, and therefore, is used in various fields. Recently, it has been studied to use the above-mentioned inkjet printing to draw an image on an inorganic substrate such as a ceramic substrate (e.g., a pottery or porcelain item, or a ceramic tile), a glass substrate, a metal substrate or the like. Specifically, for drawing a pattern, a letter or the like in the field of the inorganic substrate, handwriting, plate printing or the like has conventionally been used. However, inkjet printing does not need skilled craftsmanship, which is needed by handwriting, and can be performed quickly on demand unlike plate printing. Therefore, inkjet printing is now a target of attention from the point of view of improving productivity.

However, the inkjet printing in the field of inorganic substrates still has a lot of room for improvement. It is difficult to convert the inkjet printing technology in a field of non-firing target (paper, cloth or the like) to the inkjet printing technology in the field of inorganic substrates. For example, for a product using an inorganic substrate (inorganic item), such an inorganic substrate having an image drawn thereon is occasionally fired at 500° C. or higher (e.g., 500° C. to 1200° C.). In this case, if inkjet ink used for paper, cloth or the like is used, the pigment may possibly be discolored (or decolorized) during the firing undesirably. Therefore, the inkjet ink to be used for an inorganic substrate to be fired (inkjet ink for an inorganic substrate) is required to have a composition provided in consideration of the firing. Examples of inkjet ink for an inorganic substrate include inkjet ink described in, for example, Patent Literature 1 and Patent Literature 2. The ink described in these documents is photocurable ink including a photocurable monomer component.

Also, a surface of an inorganic substrate as a printing target occasionally has a curved surface or a convexed or concaved portion formed therein. An attempt to directly draw an image on a surface of an inorganic substrate having such a curved surface or the like results in a deformed line or the like, and there is a possibility that the clearness of the image is significantly deteriorated or a desired image cannot be drawn. For this reason, in drawing an image on an inorganic substrate having a curved surface or the like, a transfer sheet for an inorganic substrate is used. Specifically, the transfer sheet drawing the desired image is stuck to the inorganic substrate while being curved in accordance with the curved surface or the like of the inorganic substrate. By this, the desired image is transferred to the inorganic substrate. For drawing an image on such a transfer sheet, screen printing has been used. From the point of view of improving the productivity, it has recently been proposed to use inkjet printing. For example, Patent Literature 3 discloses a technology of forming a transfer sheet for ceramic industry. The decorating method disclosed in Patent Literature 3 includes a step of forming a starch layer on a surface of a mounting paper, a step of forming a porous fixing layer on a surface of the starch layer, a step of causing inorganic pigment ink to adhere to a surface of the porous fixing layer using inkjet printing, and a step of forming a frit layer for fixing the inorganic pigment ink.

CITATION LIST

Patent Document

Patent Literature 1: Japanese Patent No. 6083484
Patent Literature 2: Japanese Patent No. 5708918
Patent Literature 3: Japanese Laid-Open Patent Publication No. 2009-154419

SUMMARY OF INVENTION

Technical Problem

However, the technology described in Patent Literature 3 requires formation of a porous fixing layer and a frit layer on the surface of the base sheet in order to fix ink on the surface of the transfer sheet. Therefore, it is difficult for the technology described in Patent Literature 3 to contribute to improvement in the productivity, which is one of the objects of inkjet printing.

The present invention, made in light of such a point, has a main object of providing a technology for producing at a high productivity a transfer sheet suitable for transferring a desired image to an inorganic substrate, by using of inkjet printing.

Solution to Problem

The present inventors conceived use of photocurable ink that is fixed to a printing target by being irradiated with ultraviolet rays (UV), as a method for fixing ink to a surface of a transfer sheet without forming a layer for fixing as described in Patent Literature 3. However, use of general photocurable ink for an inorganic substrate to produce a transfer sheet caused another problem that the image (an ink after photocuring) is cracked when the transfer sheet is curved in accordance with the shape of the inorganic substrate. Based on this, the present inventors conceived that ink for a transfer sheet needs to be newly developed in consideration of the flexibility of the cured ink because the general photocurable ink for an inorganic substrate is not usable for a transfer sheet for an inorganic substrate. As a result of performing various experiments and studies on ink that is sufficiently photocurable to be appropriately fixed on a surface of a transfer sheet and is sufficiently flexible to be prevented from being cracked after being photocured, the present inventors conceived inkjet ink as disclosed herein.

The inkjet ink disclosed herein is based on the above-described knowledge and is usable for a transfer sheet for an inorganic substrate. The inkjet ink comprises an inorganic solid content including an inorganic pigment and glass; and a photocurable monomer component. The monomer component includes at least a monofunctional acrylate-based monomer containing one acryloyl group or one methacryloyl group in a molecule, a monofunctional N-vinyl compound monomer containing a nitrogen-containing compound and one vinyl group bonded to a nitrogen (N) atom of the nitrogen-containing compound, and a polyfunctional vinylether-based monomer containing at least two vinylether groups in a molecule. In the inkjet ink disclosed herein, the monofunctional acrylate-based monomer is contained at a weight ratio of 40% by mass to 96% by mass with respect to 100% by mass as the total weight of the monomer component, the monofunctional N-vinyl compound monomer is contained at a weight ratio of 2% by mass to 20% by mass with respect to 100% by mass as the total weight of the monomer component, and the polyfunctional vinylether-based monomer is contained at a weight ratio of 2% by mass to 40% by mass with respect to 100% by mass as the total weight of the monomer component.

As described below in detail, the inkjet ink having the above composition has sufficiently photocurable to be fixed to a surface of a transfer sheet preferably, and high flexibility that can prevent from cracking of ink after being photocured. Therefore, by using the inkjet ink disclosed herein, a transfer sheet, it is possible to produce at a high productivity a transfer sheet suitable for transferring an image with no crack to an inorganic substrate.

In a preferred embodiment of the inkjet ink disclosed herein, the monofunctional acrylate-based monomer contains at least one selected from the group consisting of benzylacrylate, phenoxyethylacrylate, and cyclic trimethylolpropaneformalacrylate. These are highly flexible after being photocured, among the monofunctional acrylate-based monomers. Therefore, these monomers are suitable for preventing the ink from being cracked when the transfer sheet is curved.

In a preferred embodiment of the inkjet ink disclosed herein, the monofunctional N-vinyl compound monomer is N-vinyl-2-caprolactam. Among the monofunctional N-vinyl compound monomers, N-vinyl-2-caprolactam has highly photocurable. Thus, this monomer can improve the fixability to the surface of the transfer sheet more preferably. In addition, N-vinyl-2-caprolactam can increase the stretchability after the ink is photocured and thus suppress occurrence of cracks.

In a preferred embodiment of the inkjet ink disclosed herein, the polyfunctional vinylether-based monomer contains at least one selected from the group consisting of diethyleneglycoldivinylether, triethyleneglycoldivinylether, and 1,4-cyclohexanedimethanoldivinylether. These are highly photocurable among the polyfunctional vinylether-based monomers and are low in the rigidity. Therefore, these monomers can have both of a high fixability to the surface of the substrate and a high flexibility after being photocured.

In a preferred embodiment of the inkjet ink disclosed herein, the inorganic solid content is contained at a weight ratio of 20% by mass to 50% by mass with respect to 100% by mass as the total weight of the inkjet ink. The weight ratio of the inorganic solid content in the ink is set to such a range, so that the ease of ejection from inkjet device and the post-firing color development property of the ink can be improved preferably.

The present invention provides a method for producing a transfer sheet for an inorganic substrate. The method comprises a step of adhering any one of the inkjet inks disclosed herein to a surface of a base sheet by using an inkjet device, and a step of curing the inkjet ink adhering to the surface of the base sheet by radiating ultraviolet rays toward the surface of the base sheet. With such a production method, a transfer sheet that allows an image with no crack to be appropriately transferred onto an inorganic substrate can be produced at a high productivity.

In another aspect of the present invention, a transfer sheet suitable for an inorganic substrate to be fired is provided. The transfer sheet comprises a base sheet; and an image portion containing a cured body of any of the inkjet ink disclosed herein. As described above, the image drawn with the above-described ink is sufficiently flexible, and therefore, can prevent the ink from being cracked when the transfer sheet is curved in accordance with the shape of the substrate.

The present invention provides a method for producing an inorganic item including a decorative portion. The method comprises a step of sticking the transfer sheet according to claim 7 to a surface of an inorganic substrate, and a step of firing the inorganic substrate under a condition that a highest firing temperature is set to a temperature in the range of 500° C. to 1200° C. With such a production method, a favorable decorative portion with no crack can be formed even if the inorganic substrate having a curved surface or the like is the target of decoration.

DETAILED DESCRIPTION OF THE PREFERRED EMBODIMENTS

Hereinafter, preferred embodiments of the present invention will be described. Elements that are other than the elements specifically referred to in this specification and are necessary to carry out the present invention can be understood as a matter of design based on the prior art and known to a person of ordinary skill in the art. The present invention can be carried out based on the contents disclosed in this specification and the technological common knowledge in the art.

1. Inkjet Ink

Inkjet ink disclosed herein is inkjet ink, for a transfer sheet, that is usable to draw an image on a transfer sheet for an inorganic substrate. Such inkjet ink comprises at least an inorganic solid content and a monomer component that is photocurable (photocurable monomer component). Hereinafter, components of the inkjet ink disclosed herein will be described.

(1) Inorganic Solid Content

An inorganic solid content forms a main component of a printing layer (decorative portion) after firing. The inorganic solid content includes an inorganic pigment and glass.

(a) Inorganic Pigment

An inorganic pigment is added to the ink in order to develop a desired color at a surface of a post-firing substrate. The inorganic pigment may contain, for example, a metal compound. Such an inorganic pigment has a high thermal resistance. Therefore, the pigment can be prevented from being discolored (or decolorized) while firing is performed at 500° C. or higher (e.g., 500° C. to 1200° C.) after an image is transferred onto an inorganic substrate from a transfer sheet. A specific example of such an inorganic pigment can be a composite metal compound containing at least one metal element from the group consisting of Cu, Mn, Zr, Ti, Pr, Cr, Sb, Ni, Co, Al and Cd. Among these, a Zr-based composite metal oxide mainly containing Zr (e.g., $ZrSiO_4$) is especially preferably usable from the point of view of the thermal resistance. For example, general inkjet printing combines ink of three colors of cyan, yellow and magenta to draw an image of a desired color. In the case where the above-mentioned Zr-based composite metal oxide is used as an inorganic pigment, the Zr-based composite metal oxide can be doped with a predetermined metal element to obtain inorganic pigments of the above-mentioned three colors. The Zr-based composite metal oxide for cyan can be, for example, $ZrSiO_4$—V (vanadium). The Zr-based composite metal oxide for yellow can be, for example, $ZrSiO_4$—Pr (praseodymium). The Zr-based composite metal oxide for magenta can be, for example, $ZrSiO_4$—Fe (iron).

A certain type of inkjet device can use black ink or white ink in addition to the ink of the above-mentioned three colors. An inorganic pigment preferably usable for black ink is, for example, an FeCr-based composite metal compound (e.g., spinel black). Meanwhile, an inorganic pigment preferably usable for white ink is, for example, $TiO_2$, $ZrO_2$, ZnO, $ZrSiO_4$ or the like.

The inorganic pigment is not limited to any of the above-listed materials. For the inkjet ink disclosed herein, any inorganic pigment usable for ink for an inorganic substrate is usable with no specific limitation as long as most of the effect of the present invention is not spoiled.

An inorganic pigment is typically in the form of particles. It is preferred that such an inorganic pigment in the form of particles has a particle diameter appropriately adjusted in consideration of the diameter of an ejection opening of an inkjet device described below. If the particle diameter of the inorganic pigment is too long, the inorganic pigment may undesirably clog the ejection opening and decrease the ease of ejection of the ink. A general inkjet device has an ejection opening having a diameter of about 15 μm to about 60 μm (e.g., 25 μm). Therefore, it is preferred that the particles of the inorganic pigment are made microscopic to have a $D_{100}$ particle diameter (maximum particle diameter) of 5 μm or shorter (preferably, 1 μm or shorter). The $D_{100}$ particle diameter of the inorganic pigment can be measured, for example, as the value of the 100% cumulative particle diameter considered from the microfine particle side in the cumulative particle size distribution obtained by a dynamic light scattering method is adopted.

The inorganic pigment may be formed of inorganic particles mixed and dispersed in glass described below. Such inorganic particles can be, for example, nanometal particles. Examples of the nanometal particles include nanogold particles, nanosilver particles, nanocopper particles, nanoplatinum particles, nanotitanium particles, nanopalladium particles, and the like. Nanometal particles of each type have inherent optical characteristics (e.g., strong light absorption band) in an ultraviolet light to visible light region because of the surface plasmon resonance (SPR). For example, nanogold (Au) particles absorb light of a wavelength around 530 nm (green to sky blue light) and develop a bluish red (reddish purple) color called "maroon". Therefore, in the case where, for example, red or purple ink is to be prepared, nanogold particles can be preferably usable as the nanometal particles. For example, nanosilver (Ag) particles absorb light of a wavelength around 420 nm (blue light) and develop a yellow color. Therefore, in the case where, for example, orange or yellow ink is to be prepared, nanosilver particles can be preferably usable as the nanometal particles.

In a preferred embodiment, the nanometal particles have a $D_{50}$ particle diameter of 5 nm or longer, typically 10 nm or longer, for example, 15 nm or longer. In another preferred embodiment, the nanometal particles have a $D_{50}$ particle diameter of generally 80 nm or shorter, typically 50 nm or shorter, for example, 30 nm or shorter. The $D_{50}$ particle diameter is set to a value in the above-mentioned range, so that the nanometal particles have an increased absorbance on light of a specific wavelength and thus can develop any of various colors even when being incorporated in a small amount. In addition, the above-mentioned range of the $D_{50}$ particle diameter allows a fine image with less color unevenness to be drawn.

(b) Glass

Glass is melted by firing of the inorganic. Then, the melted glass is solidified by cooling treatment. In this manner, glass causes the inorganic pigment to be fixed on a surface of a substrate. Also, glass has a function of coating the inorganic pigment after cooling, to form an image with a beautiful gloss.

Examples of the glass that can have such a nature include $SiO_2$—$B_2O_3$-based glass, $SiO_2$—RO-based (RO represents an oxide of a group-II element, for example, MgO, CaO, SrO or BaO; this is applicable to the following description) glass, $SiO_2$—RO—$R_2O$-based ($R_2O$ represents an oxide of an alkaline metal element, for example, $Li_2O$, $Naa_2O$, $K_2O$, $Rb_2O$, $Cs_2O$ or $Fr_2O$, specifically, $Li_2O$; this is applicable to the following description) glass, $SiO_2$—$B_2O_3$—$R_2O$-based glass, $SiO_2$—RO—ZnO-based glass, $SiO_2$—RO—$ZrO_2$-based glass, $SiO_2$—RO—$Al_2O_3$-based glass, $SiO_2$—RO—$Bi_2O_3$-based glass, $SiO_2$—$R_2O$-based glass, $SiO_2$—ZnO-based glass, $SiO_2$—$ZrO_2$-based glass, $SiO_2$—$Al_2O_3$-based glass, RO—$R_2O$-based glass, RO—ZnO-based glass, and the like. These types of glass can each contain one, or two or more, components in addition to the main component represented by the name thereof. Glass can be crystalline glass containing a crystal, instead of general amorphous glass.

In a preferred embodiment, $SiO_2$ occupies at least half (50 mol %) with respect to 100 mol %, which is the entirety of the glass. The ratio of $SiO_2$ can be about 80 mol % or lower. From the point of view of improving the meltability of the glass, a component such as RO, $R_2O$, $B_2O_3$ or the like can be incorporated. In a preferred embodiment, RO occupies 0 to 35 mol % with respect to 100 mol % as the entirety of the glass. In another preferred embodiment, $R_2O$ occupies 0 to 10 mol % with respect to 100 mol % as the entirety of the glass. In still another preferred embodiment, $B_2O_3$ occupies 0 to 30 mol % with respect to 100 mol % as the entirety of the glass.

In a preferred embodiment, the glass is formed of a multi-component material containing four or more components (e.g., five or more components). Such an arrangement improves the physical stability. For example, a component such as $Al_2O_3$, ZnO, CaO, $ZrO_2$ or the like can be incorporated at a ratio of, for example, 1 mol % or higher. Such an arrangement can improve the chemical durability or the abrasion resistance of a decorative portion. In a preferred embodiment, $Al_2O_3$ occupies 0 to 10 mol % with respect to 100 mol % as the entirety of the glass. In a preferred embodiment, $ZrO_2$ occupies 0 to 10 mol % with respect to 100 mol % as the entirety of the glass.

A preferred embodiment of the glass disclosed herein can be borosilicate glass having the following composition with the molar ratios converted into those of an oxide, with respect to 100 mol % as the entirety of the glass:

$SiO_2$ 40 to 70 mol % (e.g., 50 to 60 mol %);
$B_2O_3$ 10 to 40 mol % (e.g., 20 to 30 mol %);

R$_2$O (at least one of Li$_2$O, Na$_2$O, K$_2$O and Rb$_2$O) 3 to 20 mol % (e.g., 5 to 10 mol %);
Al$_2$O$_3$ 0 to 20 mol % (e.g., 5 to 10 mol %); and
ZrO$_2$ 0 to 10 mol % (e.g., 3 to 6 mol %).

The ratio of SiO$_2$ with respect to the entire glass matrix of such borosilicate glass can be, for example, 40 mol % or higher, and typically 70 mol % or lower, for example, 65 mol % or lower. The ratio of B$_2$O$_3$ with respect to the entire glass matrix can be typically 10 mol % or higher, for example, 15 mol % or higher, and typically 40 mol % or lower, for example, 35 mol % or lower. The ratio of R$_2$O with respect to the entire glass matrix can be typically 3 mol % or higher, for example, 6 mol % or higher, and typically 20 mol % or lower, for example, 15 mol % or lower. In a preferred embodiment, borosilicate glass contains Li$_2$O, Na$_2$O and K$_2$O as R$_2$O. The ratio of Li$_2$O with respect to the entire glass matrix can be, for example, 3 mol % or higher and 6 mol % or lower. The ratio of K$_2$O with respect to the entire glass matrix can be, for example, 0.5 mol % or higher and 3 mol % or lower. The ratio of Na$_2$O with respect to the entire glass matrix can be, for example, 0.5 mol % or higher and 3 mol % or lower. The ratio of Al$_2$O$_3$ with respect to the entire glass matrix can be typically 3 mol % or higher and typically 20 mol % or lower, for example, 15 mol % or lower. The ratio of ZrO$_2$ with respect to the entire glass matrix can be typically 1 mol % or higher and typically 10 mol % or lower, for example, 8 mol % or lower.

The borosilicate glass may contain an additional component other than the above. Examples of such an additional component include, in the state of an oxide, BeO, MgO, CaO, SrO, BaO, ZnO, Ag$_2$O, TiO$_2$, V$_2$O$_5$, FeO, Fe$_2$O$_3$, Fe$_3$O$_4$, CuO, Cu$_2$O, Nb$_2$O$_5$, P$_2$O$_5$, La$_2$O$_3$, CeO$_2$, Bi$_2$O$_3$, Pb$_2$O$_3$, and the like. The additional components may be contained at a ratio of about 10 mol % or lower in total with respect to 100 mol % as the entirety of the glass matrix.

Another example of the glass disclosed herein can be glass having the following composition contained at a ratio of 90 mol % of higher with the molar ratios converted into those of an oxide, with respect to 100 mol % as the entirety of the glass:
SiO$_2$ 45 to 70 mol % (e.g., 50 to 60 mol %);
SnO$_2$ 0.1 to 6 mol % (e.g., 1 to 5 mol %);
ZnO 1 to 15 mol % (e.g., 4 to 10 mol %);
RO (at least one of BeO, MgO, CaO, SrO and BaO) 15 to 35 mol % (e.g., 20 to 30 mol);
R$_2$O (at least one of Li$_2$O, Na$_2$O, K$_2$O and Rb$_2$O) 0 to 5 mol % (e.g., 1 to 5 mol); and
B$_2$O$_3$ 0 to 3 mol % (e.g., 0 to 1 mol %).

The ratio of SiO$_2$ with respect to the entire glass matrix of the glass having such a composition can be, for example, 50 mol % or higher, and typically 65 mol % or lower, for example, 60 mol % or lower. The ratio of SnO$_2$ with respect to the entire glass matrix can be typically 0.5 mol % or higher, for example, 1 mol % or higher, and typically 5.5 mol % or lower, for example, 5 mol % or lower. The ratio of ZnO with respect to the entire glass matrix can be typically 2 mol % or higher, for example, 4 mol % or higher, and typically 12 mol % or lower, for example, 10 mol % or lower. The ratio of RO with respect to the entire glass matrix can be typically 18 mol % or higher, for example, 20 mol % or higher, and typically 32 mol % or lower, for example, 30 mol % or lower. The ratio of R$_2$O with respect to the entire glass matrix can be generally 0.1 mol % or higher, for example, 1 mol % or higher, and, for example, 3 mol % or lower. The ratio of B$_2$O$_3$ with respect to the entire glass matrix can be typically 1 mol % or lower, for example, 0.1 mol % or lower.

The above-described glass may contain an additional component other than the above. Examples of such an additional component include, in the state of an oxide, Ag$_2$O, Al$_2$O$_3$, ZrO$_2$, TiO$_2$, V$_2$O$_5$, FeO, Fe$_2$O$_3$, Fe$_3$O$_4$, CuO, Cu$_2$O, Nb$_2$O$_5$, P$_2$O$_5$, La$_2$O$_3$, CeO$_2$, Bi$_2$O$_3$, and the like. The additional components may be contained at a ratio of about 10 mol % or lower in total with respect to 100 mol % as the entirety of the glass matrix.

It is preferred that the glass has a coefficient of linear thermal expansion (average coefficient of linear thermal expansion measured in a temperature range of 25° C. to 500° C. by use of a thermomechanical analyzer; this is applicable to the following description) of, for example, $4.0 \times 10^{-6}$ K$^{-1}$ to $8.0 \times 10^{-6}$ K$^{-1}$. With such a coefficient of linear thermal expansion, the difference in the contraction ratio between the glass and a target of decoration (inorganic substrate) at the time of firing is decreased, and the decorative portion is made difficult to be exfoliated or cracked. There is no specific limitation on the deformation point of the glass. The deformation point can be, for example, 400° C. to 700° C. There is no specific limitation on the transition point (Tg value based on the differential scanning calorimetry; this is applicable to the following description) of the glass. The transition point can be, for example, 400° C. to 700° C.

The glass can be typically in the form of particles. The particle diameter of such particle-like glass influences the viscosity of the ink. Therefore, it is preferred that the particle diameter is appropriately adjusted in consideration of the ease of ejection from the inkjet device. Specifically, in the case where the ink includes glass of a long particle diameter, the ejection opening may undesirably be clogged easily to decrease the ease of ejection. Therefore, it is preferred that the particle diameter of the glass is controlled such that the maximum particle diameter (D$_{100}$ particle diameter) is 1 μm or shorter (preferably, 0.85 μm or shorter). The D$_{100}$ particle diameter of the glass can be measured, for example, as the value of the 100% cumulative particle diameter considered from the microfine particle side in the cumulative particle size distribution obtained by a dynamic light scattering method is adopted.

In the inkjet ink disclosed herein, the glass has a mass ratio of preferably 65% by mass or higher, more preferably 70% by mass or higher, and still more preferably 75% by mass or higher with respect to 100% by weight, which is the total weight of the inorganic solid content. With such a mass ratio, an image having a beautiful gloss can be formed on a surface of a post-firing inorganic substrate. From the point of view of guaranteeing that the content of the inorganic pigment is a predetermined level or higher to maintain the post-firing color development property, the mass ratio of the glass is preferably 90% by mass or lower, more preferably 85% by mass or lower, and still more preferably 80% by mass or lower.

The inorganic solid content has a mass ratio (ratio of the total mass of the inorganic pigment and the glass) of, preferably 20% by mass or higher, more preferably 25% by mass or higher, and still more preferably 30% by mass or higher with respect to 100% by weight, which is the total weight of the ink. With such a mass ratio, the ease of ejection and the post-firing color development property of the ink can be improved more preferably. From the point of view of suppressing an increase in the viscosity of the ink, the mass ratio of the inorganic sold content is preferably 50% by mass or lower, more preferably 45% by mass or lower, and still more preferably 40% by mass or lower.

(2) Photocurable Monomer Component

The inkjet ink disclosed herein is photocurable inkjet ink comprising a monomer component having photocurability (photocurable monomer component). The "photocurable monomer component" in this specification refers to a material that is typically in the form of a liquid and contains at least one type of monomer of a resin polymerized (or crosslinked) and cured when being irradiated with light (e.g., ultraviolet rays). Use of the ink comprising such a photocurable monomer component allows ink having a sufficient thickness to be fixed on a surface of a transfer sheet with no need to form an ink fixing layer such as a porous fixing layer, a frit layer or the like on the transfer sheet.

The photocurable monomer component disclosed herein includes at least a (a) monofunctional acrylate-based monomer, a (b) monofunctional N-vinyl compound monomer, a (c) polyfunctional vinylether-based monomer. Use of a photocurable monomer including the monomers (a) through (c) at a predetermined ratio can provide inkjet ink having both of a high photocurability when being irradiated with UV and a high flexibility after being photocured. Hereinafter, the monomers (a) through (c) will be described specifically.

(a) Monofunctional Acrylate-Based Monomer

A monofunctional acrylate-based monomer is a compound containing one acryloyl group ($CH_2$=CHCOO—) or one methacryloyl group ($CH_2$=$CCH_3$COO—) in a molecule.

Such a monofunctional acrylate-based monomer is highly capable of diffusing an inorganic solid content and can suppress an increase in the viscosity of the ink, and therefore, can contribute to preparation of ink having a preferred ease of ejection. Among the photocurable monomers, the monofunctional acrylate-based monomer has a characteristic of being relatively low in the rigidity (high in the flexibility) after being photocured. Therefore, the inkjet ink disclosed herein includes a monofunctional acrylate-based monomer at 40% by mass or higher with respect to 100% by mass, which is the total weight of the photocurable monomer component, in order to provide high flexibility after being photocured. From the point of view of providing still better flexibility, the weight ratio of the monofunctional acrylate-based monomer is preferably 45% by mass of higher, more preferably 50% by mass or higher, still more preferably 55% by mass or higher, and especially preferably 60% by mass or higher.

In the meantime, the monofunctional acrylate-based monomer tends to be relatively low in the photocurability. Therefore, the inkjet ink disclosed herein includes the monofunctional acrylate-based monomer at 96% by mass or lower and has a highly photocurable monomer described below incorporated into the photocurable monomer component, so as to be certainly fixable to a surface of an inorganic substrate. From the point of view of providing still better photocurability, the weight ratio of the monofunctional acrylate-based monomer is preferably 90% by mass of lower, more preferably 85% by mass or lower, still more preferably 80% by mass or lower, and especially preferably 78% by mass or lower.

Specific examples of the monofunctional acrylate-based monomer include benzylacrylate, cyclic trimethylolpropaneformalacrylate, phenoxyethylacrylate, isobornylacrylate, tetrahydrofurfurylacrylate, methoxyethylacrylate, cyclohexylacrylate, ethylcarbitolacrylate, (2-methyl-2-ethyl-1,3-dioxolane-4-yl)methylacrylate, hydroxyethylacrylate, hydroxypropylacrylate, 4-hydroxybutylacrylate, methyl(meth)acrylate, ethylacrylate, propylacrylate, butylacrylate, pentylacrylate, n-stearylacrylate, butoxyethyl(meth)acrylate, tetrahydrofurfuryl(meth)acrylate, isobornyl(meth)acrylate, 2-hydroxyethyl(meth)acrylate, 2-hydroxypropyl(meth)acrylate, 2-hydroxybutyl(meth)acrylate, 2-hydroxy-3-phenoxypropyl(meth)acrylate, t-butylcyclohexyl(meth)acrylate, isoamylacrylate, lauryl(meth)acrylate, octylacrylate, isooctylacrylate, isononylacrylate, decylacrylate, isodecylacylate, tridecyl(meth)acrylate, isomyristylacrylate, isostearylacrylate, 2-ethylhexylacrylate, 2-ethylhexyl-diglycolacrylate, 4-hydroxybutylacrylate, methoxydiethyleneglycolacrylate, methoxytriethyleneglycolacrylate, ethoxydiethleneglycolacrylate, 2-(2-ethoxyethoxy)ethylacrylate, 2-ethylhexylcarbitolacrylate, phenoxyethoxyethylacylate, and the like. The above-listed (meth)acrylate compounds can be used independently or in a combination of two or more. Among these monofunctional acrylate-based monomers, benzylacrylate, phenoxyethylacrylate and cyclic trimethylolpropaneformalacrylate are especially highly flexible after being photocured, and therefore, can preferably prevent the ink from being cracked when the transfer sheet is curved.

(b) Monofunctional N-Vinyl Compound Monomer

A monofunctional N-vinyl compound monomer is a compound containing a nitrogen-containing compound and one vinyl group bonded to a nitrogen (N) atom of the nitrogen-containing compound. Herein, the "vinyl group" refers to $CH_2$=$CR^{-1}$— (in which $R^1$ is a hydrogen atom or an organic group).

Such a monofunctional N-vinyl compound monomer can increase the stretchability after the ink is photocured to suppress the occurrence of cracks. Among the photocurable monomers, the monofunctional N-vinyl compound monomer is highly photocurable and has a function of improving the fixability of the ink to a surface of a transfer sheet. Therefore, the inkjet ink disclosed herein includes a monofunctional N-vinyl compound monomer at a weight ratio of 2% by mass or higher with respect to 100% by mass as the total weight of the photocurable monomer component, so as to be sufficiently photocurable with certainty to improve the fixability thereof to the inorganic substrate. From the point of view of providing a still higher fixability, the weight ratio of the monofunctional N-vinyl compound monomer is preferably 3% by mass or higher, more preferably 4% by mass or higher, and still more preferably 5% by mass or higher.

In the meantime, there is a tendency that incorporation of the monofunctional N-vinyl compound monomer increases the rigidity (decrease the flexibility) of the cured ink. Therefore, from the point of view of preventing the occurrence of cracks after the ink is photocured, the weight ratio of the monofunctional N-vinyl compound monomer in the inkjet ink disclosed herein is set to 20% by mass or lower. From the point of view of preventing the occurrence of cracks more preferably after the ink is photocured, the content of the monofunctional N-vinyl compound monomer is preferably 17% by mass or lower, more preferably 15% by mass or lower, still more preferably 13% by mass or lower, and especially preferably 10% by mass or lower.

The above-described monofunctional N-vinyl compound monomer is represented by, for example, the following general formula (1).

$$CH_2\text{=}CR^1\text{—}NR^2R^3 \tag{1}$$

In general formula (1) shown above, $R^1$ is a hydrogen atom; or an alkyl group, a phenyl group, a benzyl group or a halogen group containing a number of carbon atoms of 1 to 4. Among these, $R^1$ is preferably a hydrogen atom or an alkyl group containing a number of carbon atoms of 1 to 4 and is more preferably a hydrogen atom. $R^2$ and $R^3$ may each be a group selected from a hydrogen atom; and an alkyl group, an alkenyl group, an alkynyl group, an aralkyl group, an alkoxy group, an alkoxyalkyl group, an alkylol group, an acetyl group ($CH_3CO$—) and an aromatic group that may contain a substituent. $R^2$ and $R^3$ may be the same as, or different from, each other. The alkyl group, the alkenyl group, the alkynyl group, the aralkyl group, the alkoxy group, the alkoxyalkyl group, the alkylol group, and the acetyl group that may contain a substituent may each contain a total number of carbon atoms of 1 to 20. The alkyl group, the alkenyl group, the alkynyl group, the aralkyl group, the alkoxy group, the alkoxyalkyl group, the alkylol group, and the acetyl group that may contain a substituent may be chain-like or cyclic and are preferably chain-like. The aromatic group is an aryl group that may contain a substituent. The aromatic group may contain a total number of carbon atoms of 6 to 36. The substituent that may be contained in the alkyl group, the alkenyl group, the alkynyl group, the aralkyl group, the alkoxy group, the alkoxyalkyl group, the alkylol group, the acetyl group, and the aromatic group contains, for example, a hydroxy group, or a halogen atom such as a fluorine atom, a chlorine atom or the like. Regarding general formula (1) shown above, $R^2$ and $R^3$ may be bonded to each other to form a cyclic structure.

Preferred embodiments of the monofunctional N-vinyl compound monomer include N-vinyl-2-caprolactam, N-vinyl-2-pyrrolidone, N-vinyl-3-morpholinone, N-vinylpiperidine, N-vinylpyrrolidine, N-vinylaziridine, N-vinylazetidine, N-vinylimidazole, N-vinylmorpholine, N-vinylpyrazole, N-vinylvalerolactam, N-vinylcarbazole, N-vinylphthalimide, N-vinylformamide, N-vinylacetamide, N-methyl-N-vinylformamide, N-methyl-N-vinylacetamide, and the like. Among these monofunctional N-vinyl compound monomers, N-vinyl-2-caprolactam is highly photocurable and can improve the fixability of the ink to a surface of a transfer sheet more preferably.

(c) Polyfunctional Vinylether-Based Monomer

A polyfunctional vinylether-based monomer is a compound containing at least two vinylether groups in a molecule. Herein, the "vinylether group" refers to —O—CH═CHR$^1$ (in which R$^1$ is a hydrogen atom or an organic group). Incorporation of such a polyfunctional vinylether-based monomer can provide a photocurable monomer component that is photocured quickly when being irradiated with UV and is highly photocurable. In addition, among the monomers that are highly photocurable, the polyfunctional vinylether-based monomer has a characteristic of being low in the rigidity (high in the flexibility) after being cured. Therefore, the inkjet ink disclosed herein includes a polyfunctional vinylether-based monomer at a weight ratio of 2% by mass or higher with respect to 100% as the total weight of the photocurable monomer component, so as to be sufficiently photocurable with certainty while suppressing a decrease in the flexibility after being photocured. From the point of view of providing still better photocurability, the weight ratio of the polyfunctional vinylether-based monomer is preferably 5% by mass of higher, more preferably 7% by mass or higher, still more preferably 10% by mass or higher, and especially preferably 15% by mass or higher.

In the meantime, in the case where only the post-curing flexibility is paid attention to, the above-described monofunctional acrylate-based monomer is better than the polyfunctional vinylether-based monomer. Therefore, if the content of the polyfunctional vinylether-based monomer is too high and the content of the monofunctional acrylate-based monomer is low, the post-curing flexibility may be insufficient and cracks may be caused. From this point of view, the weight ratio of the polyfunctional vinylether-based monomer in the inkjet ink disclosed herein is set to 40% by mass or lower. From the point of view of preventing the occurrence of cracks after the curing more certainly, the weight ratio of the polyfunctional vinylether-based monomer is preferably 35% by mass or lower, more preferably 30% by mass or lower, still more preferably 25% by mass or lower, and especially preferably 20% by mass or lower.

Preferred examples of the polyfunctional vinylether-based monomer include ethyleneglycoldivinylether, diethyleneglycoldivinylether, triethyleneglycoldivinylether, tetraethyleneglycoldivinylether, polyethyleneglycoldivinylether, propyleneglycoldivinylether, dipropyleneglycoldivinylether, tripropyleneglycoldivinylether, polypropyleneglycoldivinylether, butanedioldivinylether, neopentylglycoldivinylether, hexanedioldivinylether, nonanedioldivinylether, 1,4-cyclohexanedimethanoldivinylether, and the like. Among these, diethyleneglycoldivinylether, triethyleneglycoldivinylether, and 1,4-cyclohexanedimethanoldivinylether can have both of a high fixability to a surface of a substrate and a high post-curing flexibility, and thus are especially preferred.

(d) Other Monomers

The photocurable monomer component of the inkjet ink disclosed herein may include monomers other than the monomers (a) through (c) described above (other monomers) as long as the effect of the present invention is not significantly spoiled.

An example of such other monomers is a polyfunctional acrylate-based monomer including at least two acryloyl groups or methacryloyl groups in a molecule. Preferred examples of the polyfunctional acrylate-based monomer include 1,9-nonanediodi(meth)acrylate, 1,6-hexanediodi(meth)acrylate, 1,4-butanediodi(meth)acrylate, tricyclodecanedimethanoldiacrylate, hydroxy pivalic acid neopentylglycoldiacrylate, triethyleneglycoldi(meth)acrylate, tetraethyleneglycoldi(meth)acrylate, tripropyleneglycoldi(meth)acrylate, polypropyleneglycoldi(meth)acrylate, 1,3-butanediol(meth)acrylate, neopentylglycoldi(meth)acrylate, hexanediodi(meth)acrylate, cyclohexane-1,4-dimethanoldi(meth)acrylate, cyclohexane-1,3-dimethanoldi(meth)acrylate, 1,4-cyclohexanediodi(meth)acrylate, tetraethyleneglycoldi(meth)acrylate, pentaerythritoldi(meth)acrylate, dipentaerythritoldi(meth)acrylate, neopentylglycoldi(meth)acrylate, polytetramethyleneglycoldi(meth)acrylate, bisphenol AEO3.8 mol adduct diacrylate, trimethylolpropanetri(meth)acrylate, trimethylolethanetri(meth)acrylate, trimethyloloctanetri(meth)acrylate, pentaerythritoltri(meth)acrylate, trimethylolpropanepolyethoxytri(meth)acrylate, dipentaerythritoltri(meth)acrylate, propionic acid dipentaerythritoltri(meth)acrylate, tris(2-hydroxyethyl)isocyanuratetri(meth)acrylate, sorbitoltri(meth)acrylate, ditrimethylolpropanetetra(meth)acrylate, pentaerythritolpolyethoxytetra(meth)acrylate, pentaerythritolpolypropoxytetra(meth)acrylate, sorbitoltetra(meth)acrylate, propionic acid dipentaerythritoltetra(meth)acrylate, ethoxylated pentaerythritoltetra(meth)acrylate, sorbitolpenta(meth)acrylate, dipentaerythritolpenta(meth)acrylate, dipentaerythrirolhexa(meth)acrylate, sorbitolhexa(meth)acrylate, and the like.

Examples of the other monomers other than the polyfunctional acrylate-based monomer include butylvinylether, butylpropenylether, butylbutenylether, hexylvinylether, ethylhexylvinylether, phenylvinylether, benzylvinylether, phenylallylether, vinyl acetate, acrylamide, methacrylamide, trimethylolpropanetri((meth)acryloyloxypropyl)ether, tri((meth)acryloyloxyethyl)isocyanurate, bisphenol A diglycidyletheracrylic acid adduct, and the like.

From the point of view of causing the effect of the present invention to be exhibited preferably, it may occasionally be preferred that the photocurable monomer component does not substantially contain any of the monomers other than the monomers (a) through (c) (any of the other monomers). Herein, the expression "not substantially contain" indicates that any of the other monomers is not incorporated for the purpose of providing an effect specific to such other monomer. Namely, a case where a component that may be interpreted as the "other monomer" is unavoidably contained because of the material, the production process or the like is encompassed in the concept of "not substantially contain" in the sense of this specification. For example, in the case where the weight ratio of any of the other monomers described above is 1% by mass or lower (preferably 0.1% by mass or lower, more preferably 0.01% by mass or lower, still more preferably 0.001% by mass or lower, and especially preferably 0.0001% by mass or lower), it is interpreted that "such other monomer is not substantially contained and the photocurable monomer component is formed of the monomers (a) through (c)".

(3) Other Components

The inkjet ink disclosed herein may include a known additive usable for inkjet ink (typically, inkjet ink for an inorganic substrate and photocurable inkjet ink) (for example, a diffuser, a photoinitiator, a polymerization inhibitor, a binder, a viscosity adjuster, etc.) when necessary as long as the effect of the present invention is not spoiled. The content of each of the above-mentioned additives may be appropriately set for the purpose of incorporation and does not characterize the present invention, and thus will not be described in detail.

(a) Diffuser

The inkjet ink disclosed herein may include a diffuser. An example of usable diffuser is a cation-based diffuser. Such a cation-based diffuser adheres to a surface of an inorganic pigment efficiently by an acid-base reaction, and therefore, can suppress condensation of the above-mentioned inorganic pigment and diffuse the inorganic pigment preferably, unlike other diffusers such as a phosphoric acid-based diffuser and the like. An example of such a cation-based diffuser is an amine-based diffuser. An amine-based diffuser can prevent, by the steric effects, the condensation of the inorganic pigment and can stabilize the inorganic pigment. In addition, the amine-based diffuser can provide particles of the inorganic pigment with the same charge, and for this reason also, can prevent the condensation of the inorganic pigment preferably. Therefore, the amine-based diffuser can decrease the viscosity of the ink preferably to significantly improve the printability of the ink. Examples of such an amine-based diffuser include a fatty acid amine-based diffuser, a polyester amine-based diffuser, and the like. For example, DISPERBYK-2013 produced by BYK-Chemie Japan Kabushiki Kaisha, or the like, is preferably usable.

(b) Photoinitiator

The inkjet ink disclosed herein may include a photoinitiator. As the photoinitiator, any conventionally used photoinitiator may be appropriately selected.

Examples of such a photoinitiator include radical-based photoinitiators such as an alkylphenone-based photoinitiator, an acylphosphineoxide-based photoinitiator, and the like. Preferably usable examples of the alkylphenone-based photoinitiator include α-aminoalkylphenone-based photoinitiators (e.g., 2-methyl-1-(4-methylthiophenyl)-2-morpholinopropane-1-one, 2-benzyl-2-dimethylamino-1-(4-morpholinophenyl)-butanone-1,2-(dimethylamino)-2-[(4-methylphenyl)methyl]-1-[4-(4-morpholinyl)phenyl]-1-butanone, and the like). Other usable examples of the alkylphenone-based photoinitiator include α-hydroxyalkylphenone-based phoinitiators (1-hydroxy-cyclohexyl-phenyl-ketone, 2-hydroxy-2-methyl-1-phenyl-propane-1-one, 1-[4-(2-hydroxyethoxy)-phenyl]-2-hydroxy-2-methyl-1-propane-1-one, 2-hydroxy-1-{4-[4-(2-hydroxy-2-methyl-propionyl)-benzyl]phenyl}-2-methyl-propane-1-one, and the like).

Among the above-listed various photoinitiators, α-aminoalkylphenone-based photoinitiators such as 2-methyl-1-(4-methylthiophenyl)-2-morpholinopropane-1-one and the like can exhibit a high reactiveness to increase the curing rate of the ink and are high in the thin film curability and the surface curability, and thus are especially preferably usable.

(c) Polymerization Inhibitor

The inkjet ink disclosed herein may include a polymerization inhibitor. Incorporation of the polymerization inhibitor can suppress the photocurable monomer component from being polymerized and cured before the photocurable monomer component is used, and therefore, allows the ink to be stored easily. As the polymerization inhibitor, any polymerization inhibitor conventionally used in the field of the photocurable inkjet ink is usable with no specific limitation as long as the photocurability of the photocurable monomer component including the monomers (a) through (c) is not significantly decreased. Examples of such a polymerization inhibitor include hydroquinone, methoquinone, di-t-butyl-hydroquinone, P-methoxyphenol, butylhydroxytoluene, nitroamine salt, and the like. Among the compounds contained in these, N-nitrophenylhydroxylaminealuminum salt is highly stable during long-time storage and thus is especially preferred.

2. Preparation of the Inkjet Ink

Figure 1:
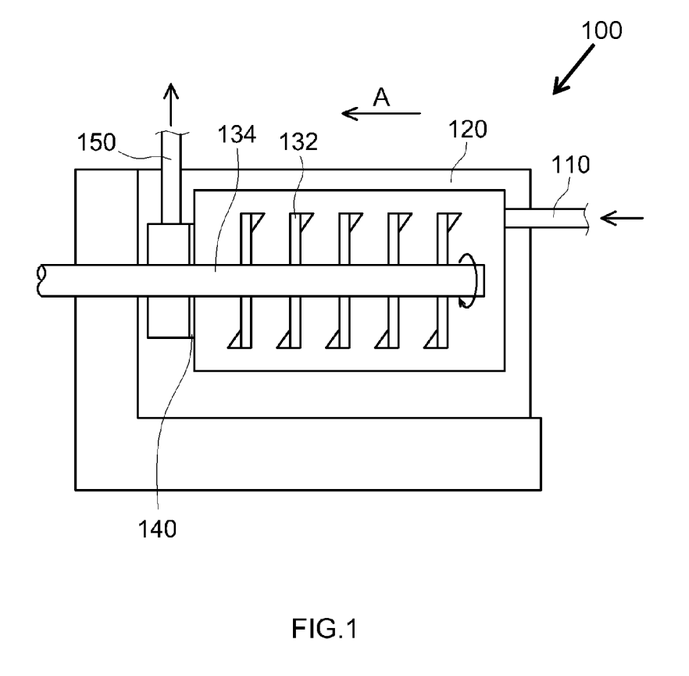
FIG. 1 is a cross-sectional view schematically showing a stirring and pulverization device usable to produce inkjet ink.

Now, a procedure of preparing (producing) the inkjet ink disclosed herein will be described. The inkjet ink disclosed herein may be prepared by mixing the above-described materials at a predetermined ratio and then grinding and diffusing the inorganic solid content. FIG. 1 is a cross-sectional view schematically showing a stirring and pulverization device usable to produce the inkjet ink. The following description is not intended to limit the inkjet ink disclosed herein.

For producing the inkjet ink disclosed herein, first, the above-described materials are weighed and mixed to prepare a slurry, which is a precursor of the ink.

Next, a stirring and pulverization device 100 as shown in FIG. 1 is used to stir the slurry and pulverize the inorganic solid content (inorganic pigment and glass). Specifically, pulverizing beads (e.g., zirconia beads having a diameter of 0.5 mm) are incorporated into the above-mentioned slurry, and then the slurry is supplied into a stirring container 120 from a supply opening 110. The stirring container 120 accommodates a shaft 134 having a plurality of stirring blades 132. One end of the shaft 134 is attached to a motor (not shown). The motor is driven to rotate the shaft 134, so that the slurry is stirred while being fed downstream with respect to a liquid feeding direction A by the plurality of stirring blades 132. During the stirring, the inorganic solid content is pulverized by the pulverizing beads incorporated into the slurry, and the inorganic solid content in the form of microscopic particles is diffused into the slurry.

The slurry reaching the downstream side with respect to the liquid feeding direction A passes a filter 140. As a result, the pulverizing beads and a portion of the inorganic solid content that was not formed into the microscopic particles are collected by the filter 140, and the inkjet ink in which the inorganic solid content in the form of the microscopic particles is sufficiently diffused is discharged from a discharge opening 150. Pore diameters of the filter 140 may be adjusted to control the maximum particle diameter of the inorganic solid content in the inkjet ink.

3. Method for Producing the Transfer Sheet (Printing Method)

Now, a method for producing a transfer sheet for an inorganic substrate using the inkjet ink disclosed herein (printing method for drawing an image on a surface of the transfer sheet) will be described.

Figure 2:
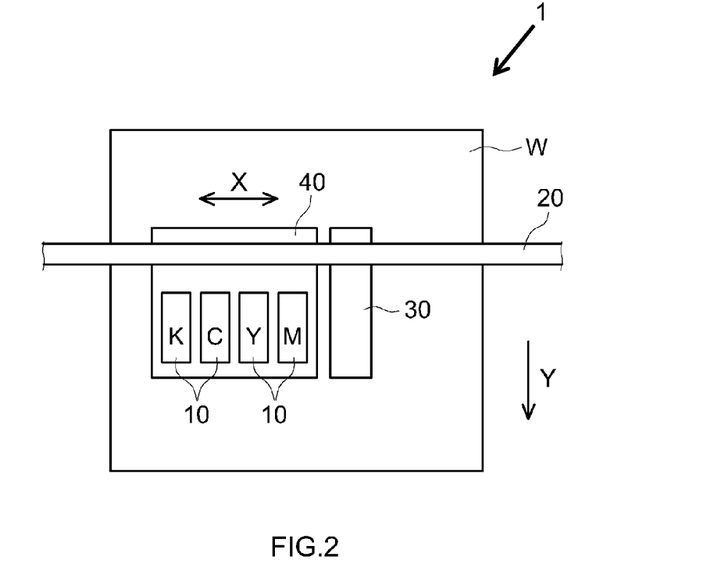
FIG. 2 is an overall view schematically showing an example of inkjet device.
Figure 3:
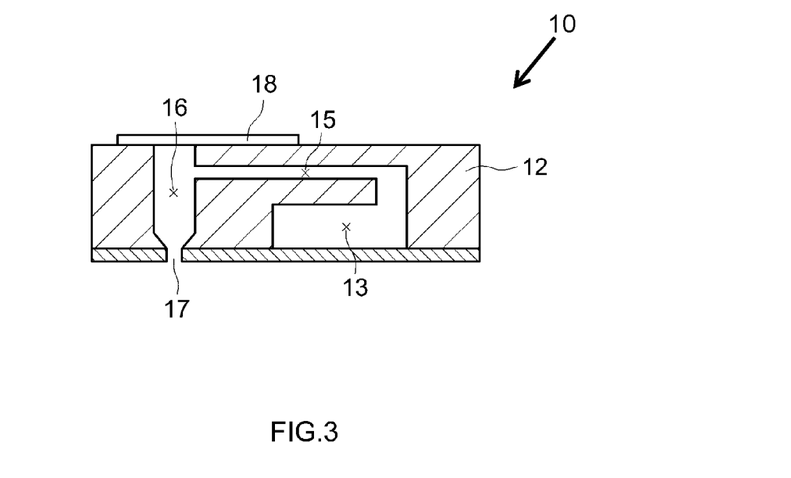
FIG. 3 is a cross-sectional view schematically showing an inkjet head in the inkjet device shown in FIG. 2.

FIG. 2 is an overall view schematically showing an example of inkjet device. FIG. 3 is a cross-sectional view schematically showing an inkjet head in the inkjet device in FIG. 2.

The inkjet ink disclosed herein is stored in inkjet heads 10 in an inkjet device 1 shown in FIG. 2. The inkjet device 1 includes four inkjet heads 10. The inkjet heads 10 respectively store ink of four different colors of black (K), cyan (C), yellow (Y) and magenta (M). The inkjet heads 10 are accommodated in a printing cartridge 40. The printing cartridge 40 is received about a guide shaft 20 and is structured to move in a reciprocating manner along an axial direction X of the guide shaft 20. Although not shown, the inkjet device 1 includes a moving mechanism that moves the guide shaft 20 in a vertical direction Y. With such a structure, the ink can be ejected from the inkjet heads 10 toward a desired position on a base sheet W of the transfer sheet.

The inkjet heads 10 shown in FIG. 2 are each, for example, a piezo-type inkjet head as shown in FIG. 3. The piezo-type inkjet head 10 includes a storage portion 13, storing the ink, provided in a case 12. The storage portion 13 is in communication with an ejection portion 16 via a liquid feeding path 15. The ejection portion 16 is provided with an ejection opening 17 opened to the outside of the case 12 and is also provided with a piezo element 18 located so as to face the ejection opening 17. In the inkjet head 10, the piezo element 18 is vibrated to eject the ink in the ejection portion 16 toward the base sheet W (see FIG. 2) from the ejection opening 17.

The guide shaft 20 in the inkjet device 1 shown in FIG. 2 is provided with a UV radiation portion 30. The UV radiation portion 30 is located adjacent to the printing cartridge 40 and moves along with the reciprocating movement of the printing cartridge 40 to radiate ultraviolet rays toward the base sheet W having the ink adhering thereto. With such an arrangement, the ink is cured immediately after adhering to the base sheet W. Therefore, even though a fixing layer such as a porous fixing layer or the like is not formed on a surface of the base sheet W, the ink can be fixed in a sufficient thickness on the surface of the transfer sheet (base sheet W).

The transfer sheet for an inorganic substrate produced in the above-described procedure includes the base sheet W, and an image portion including a cured body of the inkjet ink. As described above, the inkjet ink disclosed herein comprises a photocurable monomer component that is sufficiently flexible after being cured. Therefore, the image portion can be prevented from being cracked when the transfer sheet is curved.

4. Method for Producing an Inorganic Item

The above-described transfer sheet is used to produce an inorganic item including a decorative portion. The method for producing the inorganic item includes a step of sticking the transfer sheet to the inorganic substrate and a step of firing the inorganic substrate.

There is no specific limitation on the type of the inorganic substrate, as a target of decoration performed by the technology disclosed herein, as long as the effect of the present invention is exhibited. Any general inorganic substrate is usable with no specific limitation. Examples of the inorganic substrate include ceramic substrates such as pottery and porcelain items, ceramic tiles, and the like; glass substrates; metal substrates; and the like. There is no specific limitation on the shape of the inorganic substrate. A substrate of any desired shape is usable. As described above, the transfer sheet produced by use of the inkjet ink disclosed herein includes the image portion that is sufficiently flexible. Therefore, the image (cured ink) is prevented from being cracked when the transfer sheet is curved in accordance with the shape of the inorganic substrate. Thus, the production method disclosed herein is especially preferably usable to produce an inorganic substrate for which the transfer sheet needs to be curved (typically, inorganic substrate having a curved surface, a convexed and concaved portion, etc.).

As described above, according to the production method disclosed herein, the transfer sheet is stuck to the surface of the inorganic substrate. There is no specific limitation on the method for sticking the transfer sheet to the inorganic substrate. Any known method is usable with no specific limitation. For example, a water-soluble pressure-adhesive layer can be formed on the surface of the base sheet and the pressure-adhesive layer can be wetted, so that the transfer sheet is stuck to the surface of the inorganic substrate preferably. Even in the case where such a water-soluble pressure-adhesive layer is formed on the surface of the base sheet, the inkjet ink disclosed herein can be fixed to the surface of the printing target preferably.

According to the production method disclosed herein, next, the inorganic substrate having the transfer sheet stuck thereto is fired under a condition under in which a highest firing temperature is set to a temperature in the range of 500° C. to 1200° C. (preferably 500° C. to 1000° C., and more preferably 600° C. to 900° C.). As a result, the base sheet of the transfer sheet and a resin component including the cured monomer are burned out, and the glass in the inorganic solid content is melted. The inorganic substrate is cooled after the firing, so that the melted glass is solidified, and the inorganic pigment is fixed to the surface of the substrate. As a result, the image drawn on the transfer sheet is transferred onto the inorganic substrate, and the inorganic item including a desired decorative portion (image) is produced.

Test Examples

Hereinafter, test example according to the present invention will be described. The test examples are not intended to limit the present invention.

<Inkjet Ink>

29 types of inkjet ink (examples 1 through 29) each comprising an inorganic solid content and a photocurable monomer component were prepared. Specifically, a slurry of materials mixed at a mass ratio shown in Table 1 through Table 3 was prepared, and pulverizing beads (zirconia beads having a diameter of 0.5 mm) were used to perform a pulverization and diffusion process. As a result, the ink in examples 1 through 29 was obtained. The mass ratios in the tables are values with respect to 100% by mass as the total weight of the ink, unless otherwise specified. In the test examples, 13.6% by mass of diffuser (DISPERBYK-2013 produced by BYK-Chemie Japan Kabushiki Kaisha), 1.6% by mass of photoinitiator (Omnirad 819 produced by IGM RESINS), and 0.2% by mass of polymerization inhibitor (Q-1301 produced by FUJIFILM Wako Pure Chemical Corporation (N-nitroso-N-phenylhydroxylaminealuminum)) were incorporated in addition to the inorganic solid content and the photocurable monomer.

Regarding the inorganic solid content used in the test examples, "yellow" in Tables 1 through 3 is a zircon-based yellow inorganic pigment (zirconpraseodymium). "Cyan" is a zircon-based cyan inorganic pigment (zirconvanadium). "Black" is a spinel-based black inorganic pigment (spinel black). "Glass" is borosilicate glass having a softening point of 550° C.

Regarding the monofunctional acrylate-based monomer used in the test examples, "BZA" in the tables is benzylacrylate (produced by Osaka Organic Chemical Industry Ltd.). "PHEA" is phenoxyethylacrylate (produced by Osaka Organic Chemical Industry Ltd.). "CTFA" is cyclic trimethylolpropaneformalacrylate (produced by Osaka Organic Chemical Industry Ltd.). Regarding the monofunctional N-vinyl compound monomer (monofunctional vinylether-based monomer), "NVC" is N-vinylcaprolactam (produced by Tokyo Chemical Industry Co., Ltd.). Regarding the Polyfunctional N-vinyl compound monomer (polyfunctional vinylether-based monomer), "TEGDVE" is triethyleneglycoldivinylether (produced by Nippon Carbide Industries Co., Inc.). "DEGDVE" is dimethyleneglycoldivinylether produced by Nippon Carbide Industries Co., Inc. "CHDVE" is 1,4-cyclohexanedimethanoldivinylether (produced by Nippon Carbide Industries Co., Inc). In examples 28 and 29, a monofunctional vinylether-based monomer (EHVE: 2-ethylhexylvinylether, produced by Nippon Carbide Industries Co., Inc.) was used instead of the polyfunctional vinylether-based monomer.

<Evaluation Tests>
(1) Production of the Transfer Sheet

The ink in each of the above-mentioned examples was ejected toward a surface of a base sheet (produced by Marushige Shiko Co., Ltd.) including a water-soluble glue material-applied layer by use of an inkjet device (Material Printer (DMP-2831) produced by FUJIFILM Corporation). Ink adhering to the surface of the base sheet was irradiated with UV, so that a transfer sheet, for an inorganic substrate, having a 50 to 100 μm-thick cured body of the ink (image) formed thereon was produced.

(2) Evaluation of the Photocurability

The surface of the produced transfer sheet was wiped with waste paper, and the surface of the waste paper was visually observed. A case where the waste paper had no uncured ink adhering thereto was evaluated as having a preferred photocurability (acceptable). By contrast, a case where the waste paper had ink adhering thereto was evaluated as having an insufficient curability (unacceptable). The evaluation results are shown in Tables 1 through 3.

(3) Bending Resistance

The transfer sheet was bent such that a surface having the image formed thereon would be mountain-folded, and it was visually observed whether or not the folded portion was whitened, cracked or the like. A case where the external appearance was not changed, for example, no whitening or crack occurred, was evaluated as having a sufficient bending resistance (sufficient flexibility) (acceptable). A case where whitening or crack occurred was evaluated as having an insufficient bending resistance (insufficient flexibility) (unacceptable). The evaluation results are shown in Tables 1 through 3.

(3) Rubfastness

The surface of the transfer sheet was rubbed with waste paper, and it was visually observed whether or not the image came off or was exfoliated. A case where the external appearance of the film was not changed was evaluated as having a sufficient rubfastness (acceptable). A case where the image came off or was exfoliated was evaluated as having an insufficient rubfastness (unacceptable). The evaluation results are shown in Tables 1 through 3.

TABLE 1

| | MATERIAL | | EXAMPLE 1 | EXAMPLE 2 | EXAMPLE 3 | EXAMPLE 4 | EXAMPLE 5 |
|---|---|---|---|---|---|---|---|
| COMPOSITION (% BY MASS) | INORGANIC PIGMENT | YELLOW | 9.1 | — | — | — | — |
| | | CYAN | — | — | — | 9.1 | — |
| | | BLACK | — | 9.1 | 9.1 | — | 9.1 |
| | GLASS | | 31.6 | 31.6 | 31.6 | 31.6 | 31.6 |
| | DIFFUSER | | 13.6 | 13.6 | 13.6 | 13.6 | 13.6 |
| | MONOFUNCTIONAL ACRYLATE MONOMER | BZA | 42.2 | 42.2 | 34.3 | 30.8 | 30.8 |
| | | PHEA | — | — | — | — | — |
| | | CTFA | — | — | — | — | — |
| | MONOFUNCTIONAL N-VINYLETHER MONOMER | NVC | 0.9 | 0.9 | 8.8 | 8.8 | 8.8 |
| | POLYFUNCTIONAL VINYLETHER MONOMER | TEGDVE | 0.9 | 0.9 | 0.9 | 4.4 | 4.4 |
| | | DEGDVE | — | — | — | — | — |
| | | CHDVE | — | — | — | — | — |
| | MONOFUNCTIONAL VINYLETHER MONOMER | EHVE | — | — | — | — | — |
| | PHOTOINITIATOR | | 1.6 | 1.6 | 1.6 | 1.6 | 1.6 |
| | POLYMERIZATION INHIBITOR | | 0.2 | 0.2 | 0.2 | 0.2 | 0.2 |
| | TOTAL | | 100 | 100 | 100 | 100 | 100 |
| WEIGHT RATIO OF MONOFUNCTIONAL ACRYLATE MONOMER (vs TOTAL WEIGHT OF MONOMER) | | | 96 | 96 | 78 | 70 | 70 |
| WEIGHT RATIO OF MONOFUNCTIONAL N-VINYL COMPOUND MONOMER (vs TOTAL WEIGHT OF MONOMER) | | | 2 | 2 | 20 | 20 | 20 |
| WEIGHT RATIO OF POLYFUNCTIONAL VINYLETHER MONOMER (vs TOTAL WEIGHT OF MONOMER) | | | 2 | 2 | 2 | 10 | 10 |

TABLE 1-continued

| EVALUATION | UV CURABILITY | ACCEPTABLE | ACCEPTABLE | ACCEPTABLE | ACCEPTABLE | ACCEPTABLE |
|---|---|---|---|---|---|---|
| | BENDING RESISTANCE | ACCEPTABLE | ACCEPTABLE | ACCEPTABLE | ACCEPTABLE | ACCEPTABLE |
| | RUBFASTNESS | ACCEPTABLE | ACCEPTABLE | ACCEPTABLE | ACCEPTABLE | ACCEPTABLE |

| | MATERIAL | | EXAMPLE 6 | EXAMPLE 7 | EXAMPLE 8 | EXAMPLE 9 | EXAMPLE 10 |
|---|---|---|---|---|---|---|---|
| COMPOSITION (% BY MASS) | INORGANIC PIGMENT | YELLOW | — | — | — | — | — |
| | | CYAN | — | — | 9.1 | — | — |
| | | BLACK | 9.1 | 9.1 | — | 9.1 | 9.1 |
| | GLASS | | 31.6 | 31.6 | 31.6 | 31.6 | 31.6 |
| | DIFFUSER | | 13.6 | 13.6 | 13.6 | 13.6 | 13.6 |
| | MONOFUNCTIONAL ACRYLATE MONOMER | BZA | 26.4 | 25.5 | 17.6 | 17.6 | — |
| | | PHEA | — | — | — | — | 30.8 |
| | | CTFA | — | — | — | — | — |
| | MONOFUNCTIONAL N-VINYLETHER MONOMER | NVC | 8.8 | 0.9 | 8.8 | 8.8 | 4.4 |
| | POLYFUNCTIONAL VINYLETHER MONOMER | TEGDVE | 8.8 | 17.6 | 17.6 | 17.6 | 8.8 |
| | | DEGDVE | — | — | — | — | — |
| | | CHDVE | — | — | — | — | — |
| | MONOFUNCTIONAL VINYLETHER MONOMER | EHVE | — | — | — | — | — |
| | PHOTOINITIATOR | | 1.6 | 1.6 | 1.6 | 1.6 | 1.6 |
| | POLYMERIZATION INHIBITOR | | 0.2 | 0.2 | 0.2 | 0.2 | 0.2 |
| | TOTAL | | 100 | 100 | 100 | 100 | 100 |
| | WEIGHT RATIO OF MONOFUNCTIONAL ACRYLATE MONOMER (vs TOTAL WEIGHT OF MONOMER) | | 60 | 58 | 40 | 40 | 70 |
| | WEIGHT RATIO OF MONOFUNCTIONAL N-VINYL COMPOUND MONOMER (vs TOTAL WEIGHT OF MONOMER) | | 20 | 2 | 20 | 20 | 10 |
| | WEIGHT RATIO OF POLYFUNCTIONAL VINYLETHER MONOMER (vs TOTAL WEIGHT OF MONOMER) | | 20 | 40 | 40 | 40 | 20 |
| EVALUATION | UV CURABILITY | | ACCEPTABLE | ACCEPTABLE | ACCEPTABLE | ACCEPTABLE | ACCEPTABLE |
| | BENDING RESISTANCE | | ACCEPTABLE | ACCEPTABLE | ACCEPTABLE | ACCEPTABLE | ACCEPTABLE |
| | RUBFASTNESS | | ACCEPTABLE | ACCEPTABLE | ACCEPTABLE | ACCEPTABLE | ACCEPTABLE |

TABLE 2

| | MATERIAL | | EXAMPLE 11 | EXAMPLE 12 | EXAMPLE 13 | EXAMPLE 14 | EXAMPLE 15 |
|---|---|---|---|---|---|---|---|
| COMPOSITION (% BY MASS) | INORGANIC PIGMENT | YELLOW | — | — | — | — | 9.1 |
| | | CYAN | — | — | — | — | — |
| | | BLACK | 9.1 | 9.1 | 9.1 | 9.1 | — |
| | GLASS | | 31.6 | 31.6 | 31.6 | 31.6 | 31.6 |
| | DIFFUSER | | 13.6 | 13.6 | 13.6 | 13.6 | 13.6 |
| | MONOFUNCTIONAL ACRYLATE MONOMER | BZA | — | — | — | — | — |
| | | PHEA | 26.4 | — | — | — | — |
| | | CTFA | — | 30.8 | 26.4 | 30.8 | 30.8 |
| | MONOFUNCTIONAL N-VINYLETHER MONOMER | NVC | 4.4 | 4.4 | 4.4 | 4.4 | 6.6 |
| | POLYFUNCTIONAL VINYLETHER MONOMER | TEGDVE | 13.2 | 8.8 | — | — | 6.6 |
| | | DEGDVE | — | — | 13.2 | — | — |
| | | CHDVE | — | — | — | 8.8 | — |
| | MONOFUNCTIONAL VINYLETHER MONOMER | EHVE | — | — | — | — | — |
| | PHOTOINITIATOR | | 1.6 | 1.6 | 1.6 | 1.6 | 1.6 |
| | POLYMERIZATION INHIBITOR | | 0.2 | 0.2 | 0.2 | 0.2 | 0.2 |
| | TOTAL | | 100 | 100 | 100 | 100 | 100 |
| | WEIGHT RATIO OF MONOFUNCTIONAL ACRYLATE MONOMER (vs TOTAL WEIGHT OF MONOMER) | | 60 | 70 | 60 | 70 | 70 |
| | WEIGHT RATIO OF MONOFUNCTIONAL N-VINYL COMPOUND MONOMER (vs TOTAL WEIGHT OF MONOMER) | | 10 | 10 | 10 | 10 | 15 |
| | WEIGHT RATIO OF POLYFUNCTIONAL VINYLETHER MONOMER (vs TOTAL WEIGHT OF MONOMER) | | 30 | 20 | 30 | 20 | 15 |

TABLE 2-continued

| | | EXAMPLE 16 | EXAMPLE 17 | EXAMPLE 18 | EXAMPLE 19 | EXAMPLE 20 |
|---|---|---|---|---|---|---|
| EVALUATION | UV CURABILITY | ACCEPTABLE | ACCEPTABLE | ACCEPTABLE | ACCEPTABLE | ACCEPTABLE |
| | BENDING RESISTANCE | ACCEPTABLE | ACCEPTABLE | ACCEPTABLE | ACCEPTABLE | ACCEPTABLE |
| | RUBFASTNESS | ACCEPTABLE | ACCEPTABLE | ACCEPTABLE | ACCEPTABLE | ACCEPTABLE |

| | EXAMPLE 16 | EXAMPLE 17 | EXAMPLE 18 | EXAMPLE 19 | EXAMPLE 20 |
|---|---|---|---|---|---|
| COMPOSITION (% BY MASS) | 9.1 | — | — | — | — |
| | — | — | — | — | — |
| | — | 9.1 | 9.1 | 9.1 | 9.1 |
| | 31.6 | 31.6 | 31.6 | 31.6 | 31.6 |
| | 13.6 | 13.6 | 13.6 | 13.6 | 13.6 |
| | 43.1 | 43.1 | 39.4 | 30.8 | 43.1 |
| | — | — | — | — | — |
| | — | — | — | — | 0.9 |
| | 0.9 | 0.9 | 4.4 | 13.2 | — |
| | — | — | — | — | — |
| | — | — | — | — | — |
| | 1.6 | 1.6 | 1.6 | 1.6 | 1.6 |
| | 0.2 | 0.2 | 0.2 | 0.2 | 0.2 |
| TOTAL | 100 | 100 | 100 | 100 | 100 |
| WEIGHT RATIO OF MONOFUNCTIONAL ACRYLATE MONOMER (vs TOTAL WEIGHT OF MONOMER) | 98 | 98 | 90 | 70 | 98 |
| WEIGHT RATIO OF MONOFUNCTIONAL N-V1NYL COMPOUND MONOMER (vs TOTAL WEIGHT OF MONOMER) | 0 | 0 | 0 | 0 | 2 |
| WEIGHT RATIO OF POLYFUNCTIONAL VINYLETHER MONOMER (vs TOTAL WEIGHT OF MONOMER) | 2 | 2 | 10 | 30 | 0 |
| EVALUATION | UNACCEPTABLE | UNACCEPTABLE | UNACCEPTABLE | UNACCEPTABLE | UNACCEPTABLE |
| | — | — | — | — | — |
| | — | — | — | — | — |

TABLE 3

| | MATERIAL | | EXAMPLE 21 | EXAMPLE 22 | EXAMPLE 23 | EXAMPLE 24 | EXAMPLE 25 |
|---|---|---|---|---|---|---|---|
| COMPOSITION (% BY MASS) | INORGANIC PIGMENT | YELLOW | — | 9.1 | — | — | — |
| | | CYAN | — | — | — | — | — |
| | | BLACK | 9.1 | — | 9.1 | 9.1 | 9.1 |
| | GLASS | | 31.6 | 31.6 | 31.6 | 31.6 | 31.6 |
| | DIFFUSER | | 13.6 | 13.6 | 13.6 | 13.6 | 13.6 |
| | MONOFUNCTIONAL ACRYLATE MONOMER | BZA | 29.9 | 22.0 | 21.1 | 13.2 | 13.2 |
| | | PHEA | — | — | — | — | — |
| | | CTFA | — | — | — | — | — |
| | MONOFUNCTIONAL N-VINYLETHER MONOMER | NVC | 13.2 | 13.2 | 0.9 | 13.2 | 8.8 |
| | POLYFUNCTIONAL VINYLETHER MONOMER | TEGDVE | 0.9 | 8.8 | 22.0 | 17.6 | 22.0 |
| | | DEGDVE | — | — | — | — | — |
| | | CHDVE | — | — | — | — | — |
| | MONOFUNCTIONAL VINYLETHER MONOMER | EHVE | — | — | — | — | — |
| | PHOTOINITIATOR | | 1.6 | 1.6 | 1.6 | 1.6 | 1.6 |
| | POLYMERIZATION INHIBITOR | | 0.2 | 0.2 | 0.2 | 0.2 | 0.2 |
| TOTAL | | | 100 | 100 | 100 | 100 | 100 |
| WEIGHT RATIO OF MONOFUNCTIONAL ACRYLATE MONOMER (vs TOTAL WEIGHT OF MONOMER) | | | 68 | 50 | 48 | 30 | 30 |
| WEIGHT RATIO OF MONOFUNCTIONAL N-V1NYL COMPOUND MONOMER (vs TOTAL WEIGHT OF MONOMER) | | | 30 | 30 | 2 | 30 | 20 |
| WEIGHT RATIO OF POLYFUNCTIONAL VINYLETHER MONOMER (vs TOTAL WEIGHT OF MONOMER) | | | 2 | 20 | 50 | 40 | 50 |
| EVALUATION | UV CURABILITY | | ACCEPTABLE | ACCEPTABLE | ACCEPTABLE | ACCEPTABLE | ACCEPTABLE |
| | BENDING RESISTANCE | | UNACCEPTABLE | UNACCEPTABLE | UNACCEPTABLE | UNACCEPTABLE | ACCEPTABLE |
| | RUBFASTNESS | | ACCEPTABLE | ACCEPTABLE | ACCEPTABLE | ACCEPTABLE | UNACCEPTABLE |

TABLE 3-continued

| | MATERIAL | | EXAMPLE 26 | EXAMPLE 27 | EXAMPLE 28 | EXAMPLE 29 |
|---|---|---|---|---|---|---|
| COMPOSITION (% BY MASS) | INORGANIC PIGMENT | YELLOW | 9.1 | — | — | 9.1 |
| | | CYAN | — | — | — | — |
| | | BLACK | — | 9.1 | 9.1 | — |
| | GLASS | | 31.6 | 31.6 | 31.6 | 31.6 |
| | DIFFUSER | | 13.6 | 13.6 | 13.6 | 13.6 |
| | MONOFUNCTIONAL ACRYLATE MONOMER | BZA | 25.1 | 8.8 | 38.7 | 30.8 |
| | | PHEA | — | — | — | — |
| | | CTFA | — | — | — | — |
| | MONOFUNCTIONAL N-VINYLETHER MONOMER | NVC | 10.1 | 13.2 | 0.9 | 4.4 |
| | POLYFUNCTIONAL VINYLETHER MONOMER | TEGDVE | 8.8 | 22.0 | — | — |
| | | DEGDVE | — | — | — | — |
| | | CHDVE | — | — | — | — |
| | MONOFUNCTIONAL VINYLETHER MONOMER | EHVE | — | — | 4.4 | 8.8 |
| | PHOTOINITIATOR | | 1.6 | 1.6 | 1.6 | 1.6 |
| | POLYMERIZATION INHIBITOR | | 0.2 | 0.2 | 0.2 | 0.2 |
| | TOTAL | | 100 | 100 | 100 | 100 |
| WEIGHT RATIO OF MONOFUNCTIONAL ACRYLATE MONOMER (vs TOTAL WEIGHT OF MONOMER) | | | 57 | 20 | 88 | 70 |
| WEIGHT RATIO OF MONOFUNCTIONAL N-V1NYL COMPOUND MONOMER (vs TOTAL WEIGHT OF MONOMER) | | | 23 | 30 | 2 | 10 |
| WEIGHT RATIO OF POLYFUNCTIONAL VINYLETHER MONOMER (vs TOTAL WEIGHT OF MONOMER) | | | 20 | 50 | 10 | 20 |
| EVALUATION | UV CURABILITY | | ACCEPTABLE | ACCEPTABLE | UNACCEPTABLE | UNACCEPTABLE |
| | BENDING RESISTANCE | | UNACCEPTABLE | UNACCEPTABLE | — | — |
| | RUBFASTNESS | | ACCEPTABLE | ACCEPTABLE | — | — |

As shown in Tables 1 through 3, in examples 1 through 15, preferred results were obtained in all the photocurability, the bending resistance and the rubfastness. From this, it has been confirmed that use of a photocurable monomer component formed by mixing a monofunctional acrylate-based monomer, a monofunctional N-vinyl compound monomer, and a polyfunctional vinylether-based monomer at a predetermined ratio can provide both of a high photocurability and a high flexibility.

Specific examples of the present invention have been described so far. These examples are merely illustrative, and do not limit the scope of the claims in any way. The technology in the scope of the claims encompasses various alterations and modifications of the above-described specific examples.

REFERENCE SIGNS LIST

1 Inkjet device
10 Inkjet head
12 Case
13 Storage portion
15 Liquid feeding path
16 Ejection portion
17 Ejection opening
18 Piezo element
20 Guide shaft
30 UV radiation portion
40 Printing cartridge
100 Stirring and pulverization device
110 Supply opening
120 Stirring container
132 Stirring blade
134 Shaft
140 Filter
150 Discharge opening
A Liquid feeding direction
X Axial direction of the guide shaft
Y Vertical direction with respect to the guide shaft

The invention claimed is:
1. Inkjet ink usable for a transfer sheet suitable for an inorganic substrate, the inkjet ink comprising:
   an inorganic solid content including an inorganic pigment and glass; and
   a monomer component having photocurability,
   wherein:
   the inorganic pigment comprises a composite metal compound containing at least one metal element selected from the group consisting of Fe, Cu, Mn, Zr, Ti, Pr, Cr, Sb, Ni, Co, Al and Cd,
   the maximum particle diameter of the glass is 1 μm or shorter,
   the mass ratio of the glass to the total weight of the inorganic solid content is 65% by mass or more and 90% by mass or less,
   the monomer component includes at least:
     a monofunctional acrylate-based monomer containing one acryloyl group or one methacryloyl group in a molecule;
     a monofunctional N-vinyl compound monomer containing a nitrogen-containing compound and one vinyl group bonded to a nitrogen (N) atom of the nitrogen-containing compound; and
     a polyfunctional vinylether-based monomer containing at least two vinylether groups in a molecule, the monofunctional acrylate-based monomer is contained at a weight ratio of 60% by mass to 96% by mass with respect to 100% by mass as the total weight of the monomer component, the monofunctional N-vinyl compound monomer is contained at a weight ratio of 2% by mass to 20% by mass with respect to 100% by mass as the total weight of the monomer component, and the polyfunctional vinylether-based monomer is contained at a weight ratio of 2% by mass to 40% by mass with respect to 100% by mass as the total weight of the monomer component.

2. The inkjet ink according to claim 1, wherein the monofunctional acrylate-based monomer contains at least one selected from the group consisting of benzylacrylate, phenoxyethylacrylate, and cyclic trimethylolpropaneformalacrylate.

3. The inkjet ink according to claim 1, wherein the monofunctional N-vinyl compound monomer is N-vinyl-2-caprolactam.

4. The inkjet ink according to claim 1, wherein the polyfunctional vinylether-based monomer contains at least one selected from the group consisting of diethyleneglycoldivinylether, triethyleneglycoldivinylether, and 1,4-cyclohexanedimethanoldivinylether.

5. The inkjet ink according to claim 1, wherein the inorganic solid content is contained at a weight ratio of 20% by mass to 50% by mass with respect to 100% by mass as the total weight of the inkjet ink.

6. A method for producing a transfer sheet for an inorganic substrate to be fired, the method comprising:
a step of adhering the inkjet ink according to claim 1 to a surface of a base sheet by using an inkjet device; and
a step of curing the inkjet ink adhering to the surface of the base sheet by radiating ultraviolet rays toward the surface of the base sheet.

7. A transfer sheet suitable for an inorganic substrate to be fired, the transfer sheet comprising:
a base sheet; and
an image portion including a cured body of the inkjet ink according to claim 1.

8. A method for producing an inorganic item including a decorative portion, the method comprising:
a step of sticking the transfer sheet according to claim 7 to a surface of an inorganic substrate; and
a step of firing the inorganic substrate under a condition that a highest firing temperature is set to a temperature in the range of 500° C. to 1200° C.

9. The inkjet ink according to claim 2, wherein the monofunctional N-vinyl compound monomer is N-vinyl-2-caprolactam.

10. The inkjet ink according to claim 2, wherein the inorganic solid content is contained at a weight ratio of 20% by mass to 50% by mass with respect to 100% by mass as the total weight of the inkjet ink.

11. The inkjet ink according to claim 3, wherein the inorganic solid content is contained at a weight ratio of 20% by mass to 50% by mass with respect to 100% by mass as the total weight of the inkjet ink.

12. The inkjet ink according to claim 4, wherein the inorganic solid content is contained at a weight ratio of 20% by mass to 50% by mass with respect to 100% by mass as the total weight of the inkjet ink.

13. A method for producing a transfer sheet for an inorganic substrate to be fired, the method comprising:
a step of adhering the inkjet ink according to claim 2 to a surface of a base sheet by using an inkjet device; and
a step of curing the inkjet ink adhering to the surface of the base sheet by radiating ultraviolet rays toward the surface of the base sheet.

14. A method for producing a transfer sheet for an inorganic substrate to be fired, the method comprising:
a step of adhering the inkjet ink according to claim 3 to a surface of a base sheet by using an inkjet device; and
a step of curing the inkjet ink adhering to the surface of the base sheet by radiating ultraviolet rays toward the surface of the base sheet.

15. A transfer sheet suitable for an inorganic substrate to be fired, the transfer sheet comprising:
a base sheet; and
an image portion including a cured body of the inkjet ink according to claim 2.

16. A transfer sheet suitable for an inorganic substrate to be fired, the transfer sheet comprising:
a base sheet; and
an image portion including a cured body of the inkjet ink according to claim 3.

17. A transfer sheet suitable for an inorganic substrate to be fired, the transfer sheet comprising:
a base sheet; and
an image portion including a cured body of the inkjet ink according to claim 4.

18. A transfer sheet suitable for an inorganic substrate to be fired, the transfer sheet comprising:
a base sheet; and
an image portion including a cured body of the inkjet ink according to claim 5.

19. The inkjet ink according to claim 1, wherein the glass comprises a borosilicate glass having the following composition with the molar ratios converted into those of an oxide, with respect to 100 mol % as the entirety of the glass:
$SiO_2$ 40 to 70 mol %;
$B_2O_3$ 10 to 40 mol %;
at least one of $Li_2O$, $Na_2O$, $K_2O$ and $Rb_2O$ 3 to 20 mol %;
$Al_2O_3$ 0 to 20 mol %; and
$ZrO_2$ 0 to 10 mol %.

20. The inkjet ink according to claim 1, wherein the glass comprises a glass having the following composition with the molar ratios converted into those of an oxide, with respect to 100 mol % as the entirety of the glass:
$SiO_2$ 45 to 70 mol %;
$SnO_2$ 0.1 to 6 mol %;
$ZnO$ 1 to 15 mol %;
at least one of BeO, MgO, CaO, SrO and BaO 15 to 35 mol %;
at least one of $Li_2O$, $Na_2O$, $K_2O$ and $Rb_2O$ 0 to 5 mol %; and
$B_2O_3$ 0 to 3 mol %.

* * * * *